Oct. 16, 1928.
C. G. MILLER ET AL
1,687,844
PICKLING MACHINE
Filed Aug. 22, 1925  5 Sheets-Sheet 3
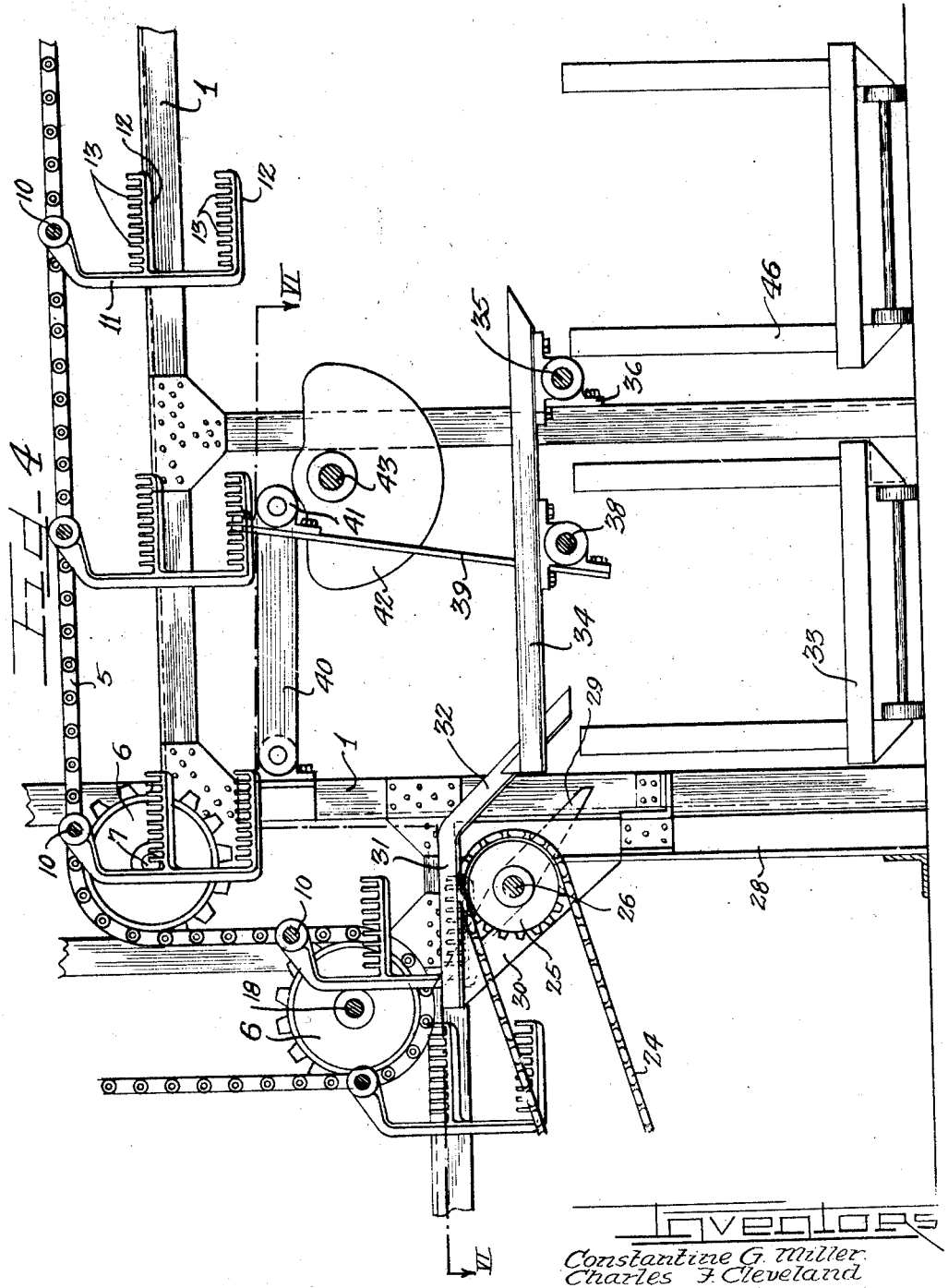

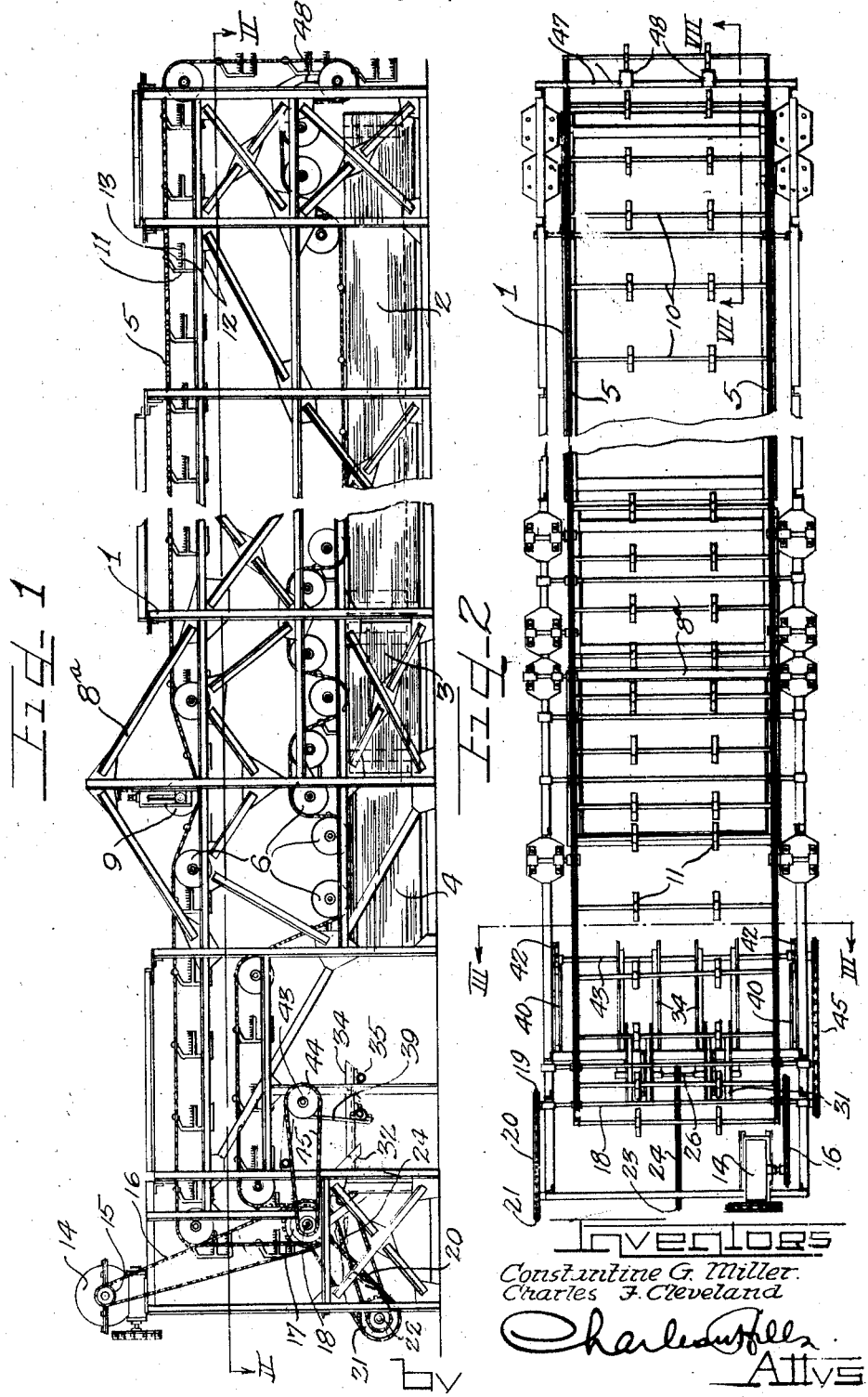

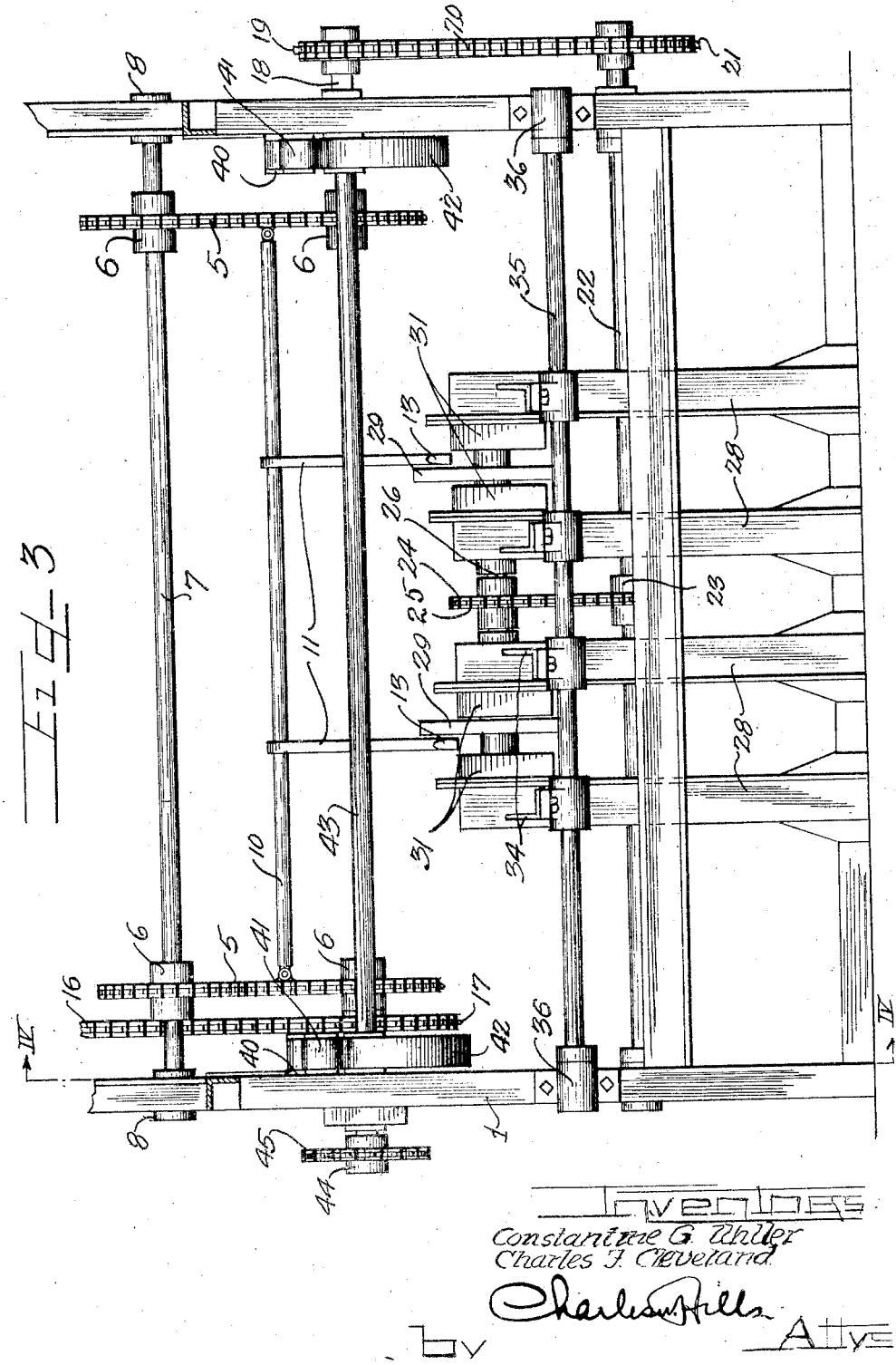

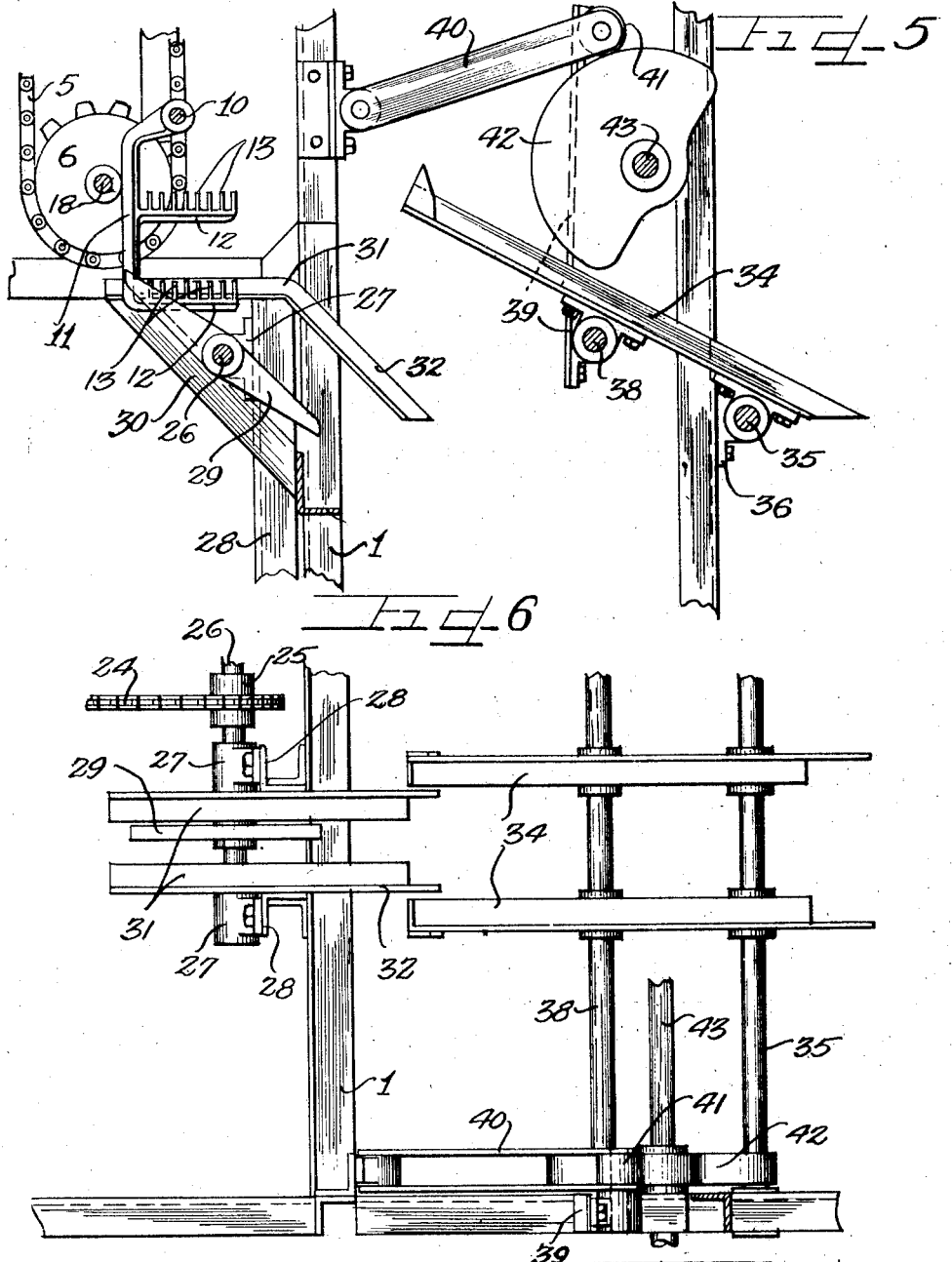

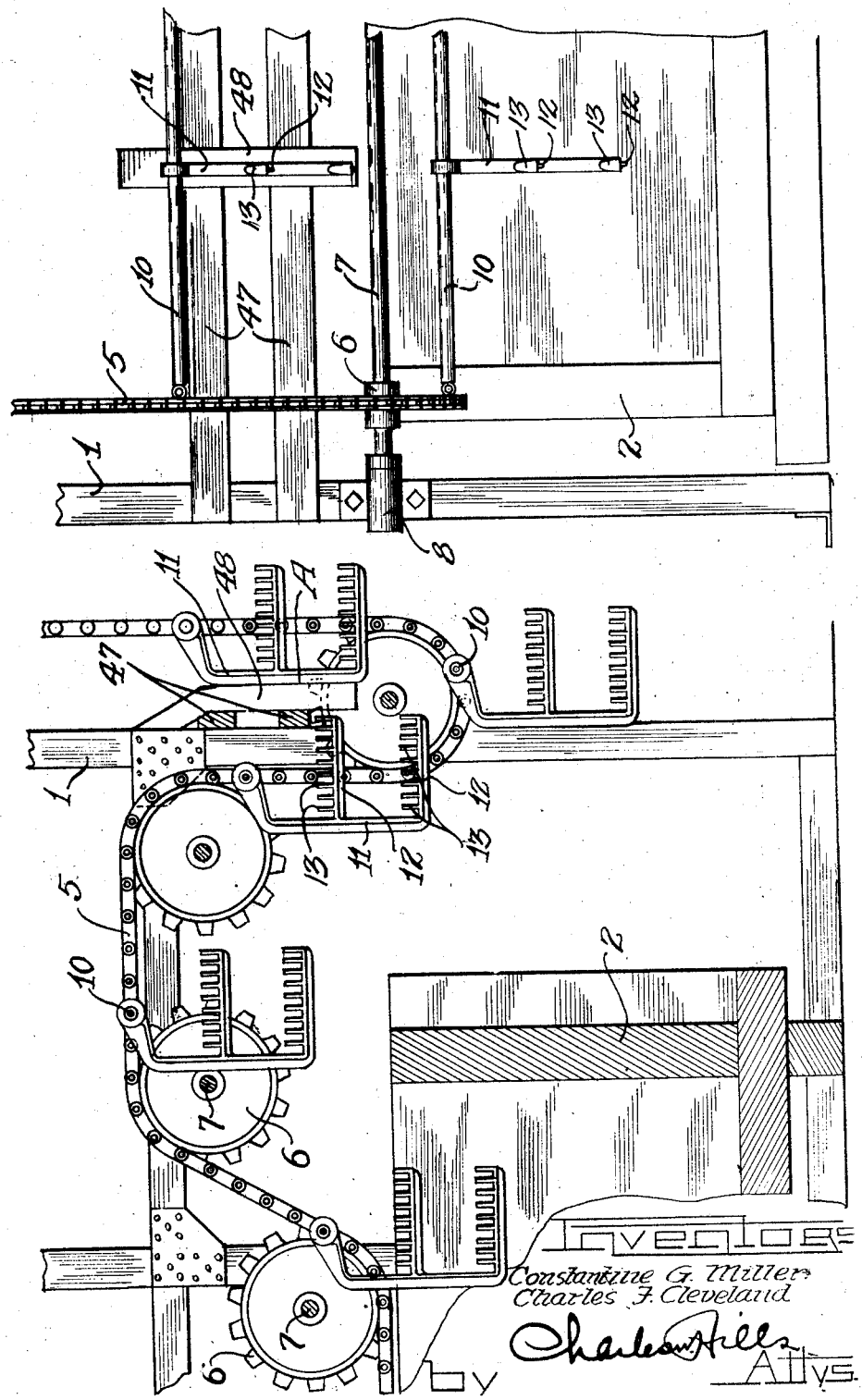

Patented Oct. 16, 1928.

1,687,844

UNITED STATES PATENT OFFICE.

CONSTANTINE G. MILLER AND CHARLES F. CLEVELAND, OF CHICAGO, ILLINOIS, ASSIGNORS TO THE MEAKER COMPANY, A CORPORATION OF ILLINOIS.

PICKLING MACHINE.

Application filed August 22, 1925. Serial No. 51,726.

This invention relates to an automatic pickling machine and more particularly to the improved loading and unloading or delivery mechanisms for handling metal strips of various kinds.

It is an important object of this invention to provide improved loading and delivering mechanisms for a pickling machine. It is also an object of this invention to provide a pickling machine with improved double hook type carriers on conveyor chains and means for automatically removing strips from said carriers and then automatically distributing the removed strips into selected receiving means.

Still another object of the invention is to provide an automatic pickling machine wherein double hook type conveyors are adapted to have alternate groups of the hook members arranged to carry twice as many ring strips as rim strips into the field of operation of a kick-off mechanism, adapted to automatically remove the ring members onto a cam-controlled table for delivery into a ring truck during the time that the kick-off mechanism removes and delivers the rim members onto a platform for direct delivery into a rim truck.

It is an important object of this invention to provide an automatic pickling machine with improved conveying, unloading and sorting mechanisms whereby quantities of rim strips and ring strips carried on adjacent groups of conveyor carriers are adapted to be selectively removed from the carriers and selectively delivered into a plurality of receiving containers.

Other and further important objects of this invention will be apparent from the disclosures in the drawings and specification.

The invention (in a preferred form) is illustrated in the drawings and hereinafter more fully described.

On the drawings:

Figure 1 illustrates a fragmentary side elevation of an improved automatic pickling machine embodying the principles of this invention.

Figure 2 is a horizontal section of the machine taken on line II—II of Figure 1.

Figure 3 is an enlarged fragmentary transverse section taken on line III—III of Figure 2.

Figure 4 is an enlarged fragmentary sectional view taken on line IV—IV of Figure 3, showing the ring discharge table in horizontal receiving position.

Figure 5 is a fragmentary sectional elevation of the delivery mechanism with the ring receiving table in its elevated inclined position for the purpose of discharging ring strips therefrom and clearing the path of the rim strips from the rim platform.

Figure 6 is a fragmentary plan view of the platform and table mechanism taken on line VI—VI of Figure 4.

Figure 7 is an enlarged fragmentary vertical detail section taken on line VII—VII of Figure 2, illustrating the loading position of the carriers.

Figure 8 is a fragmentary elevation of the portion of the machine shown in Figure 7.

As shown on the drawings:

The reference numeral 1 indicates a machine framework of the usual construction, the details of which will not be entered into here. Mounted in a longitudinal row from the base members of the framework 1 is a wooden pickling tank 2, a cold water or rinsing tank 3, and a neutralizing tank 4. These tanks are arranged in the order in which the articles to be pickled are to be treated. A pair of endless conveyor chains 5 are mounted along the opposite sides of the row of tanks and are supported by a plurality of sprockets 6 mounted on a plurality of transversely disposed shafts 7 journalled in suitable bearings 8 mounted on the framework 1. Mounted upon a framework extension $8^a$ is a slack take-up device 9 (Figure 1) for the endless conveyor chains 5. The sprockets 6 supporting the lower laps of the conveyor chains 5 are arranged, as clearly illustrated in Figure 1, for the purpose of automatically delivering and removing the articles to be pickled in consecutive order in the tanks 2, 3 and 4. Connecting the two endless chains 5 at spaced intervals are a plurality of transversely disposed rods or connecting bars 10 on each of which a pair of spaced carriers are pivotally mounted. Each of the improved carriers comprises a shank portion 11 having integrally formed thereon at right angles a pair of parallel brackets or arms 12, each of which is provided with a plurality of integral, upwardly projecting spacing teeth or lugs 13. The carriers 12—13 are arranged in pairs and pivotally supported on the respective connecting rods 10 of the endless conveyors 5 so that said pivoted carriers will hang by gravity in a substantially vertical position during their path of travel through the machine. The carriers are provided with the spacing teeth 13 to permit a plurality of rim strips or ring strips to be carried by each pair of carriers with said strips positioned in two parallel layers and in spaced parallel relation. Two sets or pairs of the carriers are adapted to carry a plurality of metal rim strips while an adjacent single set or pair of the carriers are adapted to carry a plurality of metal ring strips. It will thus be seen that the conveyors will convey the same number of each kind of strips through the machine even though the space occupied by a rim strip is twice as great as that occupied by a ring strip. The rim strips and ring strips are thus carried in alternate quantities through the machine.

Mounted upon the upper end of the discharge or delivery end section of the machine frame is a reducing gear 14 connected to a suitable power source and having a sprocket 15 mounted on the shaft thereof for the purpose of driving an endless chain 16. The drive chain 16 is also trained around a sprocket 17 securely mounted on a transverse shaft 18 also having a pair of the sprockets 6 mounted thereon for the purpose of transmitting a drive to the endless conveyor chains 5. Mounted on one projecting end of the transverse conveyor drive shaft 18 is a sprocket 19 around which an endless chain 20 is engaged. The chain 20 is also engaged around a sprocket 21 which is mounted on one projecting end of a transverse shaft 22 which is journalled in suitable bearings mounted on the discharge end of the machine frame. Also mounted on the transverse shaft 22 intermediate the ends thereof is a sprocket 23 adapted to drive a chain 24. The chain 24 is trained around a sprocket 25 mounted on the middle portion of a stub shaft 26. The stub shaft 26 is journalled in a plurality of bearings 27 which are secured to angle members 28 mounted on the machine framework. Securely mounted on the stub shaft 26 are a pair of spaced kick-off arms 29 positioned adjacent the inner sides of the conveyor chain carriers 11—13, as clearly illustrated in Figure 3. Rigidly secured to the upright angle members 28 are a plurality of brackets 30 to afford supports for an article-receiving platform comprising a plurality of angle irons 31, the ends of which are bent down in an inclined plane to afford a discharge apron 32. The article-discharge apron 32 is provided for the discharge of the rim strips and ring strips after they have been removed from the carriers as they pass through the platform 31. The apron 32 projects downwardly into a space, as indicated in Figure 4, provided for a receiving truck or container 33 which is adapted to be rolled into position in the machine frame for the purpose of receiving the pickled rim strips as they are discharged from the machine over the apron 32.

The rim strips are adapted to be discharged directly from the platform 31 and the apron 32 into the rim strip receiving truck 33 while the ring strips are adapted to be delivered from the apron 32 onto a table constructed of a plurality of parallel spaced angle irons 34 which are secured upon a transverse table shaft 35 journalled in suitable bearings 36 on the machine frame 1, as clearly illustrated in Figure 3. The angle members comprising the stationary apron 32 of the platform 31 project downwardly between the spaced angle members 34 which comprise the pivoted ring strip receiving table. The table angle members 34 are connected by means of a transverse shaft 38. Secured to the ends of the shaft 38 are two bars 39 which project upwardly and have the upper ends thereof secured to arms 40 which are pivotally mounted on brackets secured to the machine framework 1. Each of the brackets 40 carries a roller 41 which is adapted to track on a control cam 42 secured on a shaft 43. Mounted on one projecting end of the shaft 43 is a sprocket 44 around which an endless chain 45 is trained. The chain 45 receives its drive from a sprocket mounted on one projecting end of the transverse shaft 18 which operates the conveyor chains. The cams 42 are formed and set to be operated from the shaft 43 so that at predetermined times in the travel of the conveyor chains the cams acting on the rollers 41 will swing the arms 40 upwardly, thereby causing the connecting bars 39 to move the pivoted table 34 from its horizontal receiving position illustrated in Figure 4 into its elevated and discharge position as illustrated in Figure 5. A supply of ring strips which have been deposited upon the table 34 will be discharged by gravity from said table when in its inclined position into a ring strip receiving truck or container 46 which is adapted to be moved into the machine adjacent the truck 33 as illustrated in Figure 4. The cams 42 are so timed that they act to hold the table 34 in its inclined discharging position during a period sufficient to permit a quantity of rim strips to be removed from two sets of carriers and deposited on the platform 31 to be pushed onto the apron 32 from which said rim strips are adapted to be discharged by gravity into the receiving truck 33 before the cams 42 permit the pivoted table 34 to be returned to its normal horizontal ring strip receiving position.

In Figures 1 and 7 it will be noted that the loading end of the machine framework has mounted thereon a pair of transverse bars 47 to which a pair of carrier guides and stops 48 are secured. The upper ends of the guides 48 are inclined to permit the lower corners of the carrier to track thereon as they are moved into a loading position (designated by the letter A) in Figure 7. When in loading position the carriers 11 are adapted to be engaged against the stops or guides 48 to hold said carriers against swinging inwardly while they are being loaded with rim strips or ring strips.

The operation is as follows:

The conveyor chains 5 which carry the improved double-hook type carriers 11 are adapted to be operated from the power source through the reducing gear 14 through the chain 16 which is adapted to drive the transverse shaft 18 and the sprocket 17 engaged thereon. The pivoted or hanging carriers of said conveyor chains are adapted to follow a predetermined irregular path through the machine, said path being determined by the guide sprockets 6, as clearly illustrated in Figure 1. When a pair of carriers 11 reach the loading end of the machine and descend through a vertical plane said carriers move downwardly into a position adjacent the guide members or stops 48 into a loading position A illustrated in Figure 7. An operator will quickly deposit a plurality of rim strips between the teeth 13 of both the upper and lower hook arms 12 of said carriers. The stops 48 hold the carriers against swinging inwardly while they are being loaded. A second set of carriers are now permitted to move into loading position to permit an operator to load the same with a plurality of rim strips. After two sets of carriers have been loaded as described with rim strips the third set of carriers, when moved into loading position, is loaded with a plurality of ring strips. This process or method of loading the carriers is followed by the operator so that a group of two pairs of carriers is loaded with rim strips while an alternate group of one pair of carriers is loaded with ring strips.

The loaded carriers are conveyed through the machine from the loading position A towards the discharge end of the machine and follow an irregular path permitting the rim strips and ring strips to be lowered and carried through the pickling tank 2 after which they are automatically raised and carried over into the cold water or rinsing tank 3 from which they are automatically elevated and carried over into the neutralizing tank 4. From the neutralizing tank 4 the pickled rim strips and ring strips are carried upwardly through a horizontal path and then downwardly through a vertical path through the stationary platform 31 to permit the articles to be removed from the carriers and positioned in the field of operation of the two rotating kick-off arms 29 which are mounted on the kick-off driving shaft 26. The kick-off driving shaft 26 is rotated by means of the chain 24 from the shaft 22 which in turn receives its drive from the chain 20 and the sprocket 19 which is secured on one end of the driving shaft 18.

As a set of carriers, loaded with ring strips, approach the rotating kick-off arms 29, the cams 42 are positioned as illustrated in Figure 4 so that the pivoted table 34 is located in its horizontal receiving position. While one end of the kick-off arms engages and sweeps the ring strips removed from the lower hooks of the carriers over the platform 31 and over the apron 32 for delivery onto the table 34, the other ends of the kick-off arms move into position to sweep the ring strips removed from the upper hooks of the carriers off of said platform and onto the table. After a set of ring strip carriers have been unloaded and the ring strips have been deposited upon the table 34 the cams 42 coacting with the rollers 41 raise the arms 40 and the connecting bars 39 so that the table 34 is swung upwardly from its horizontal receiving position illustrated in Figure 4 into its inclined discharging position illustrated in Figure 5. The ring strips on said inclined table are thus permitted to slide by gravity off of said table into the ring strip receiving truck or container 46, positioned as shown in Figure 4. During the time that the cams 42 hold the ring strip table 34 in its inclined discharging position two sets of rim strip carriers have been advanced through the platform 31 which acts to strip the rim strips from the carriers. The rim strips thus deposited on the platform 31 are left in the field of operation of the rotating kick-off arms which act to push said rim strips over onto the discharge apron 32 to permit the rim strips to slide by gravity directly into the rim strip receiving truck or container 33 positioned as illustrated in Figure 4. It will thus be seen that the same number of rim strips are deposited in the truck 33 as ring strips in the truck 46, due to the loading arrangement of the carriers and the timing of the cams 42 which govern the operation of the ring strip receiving table 34.

While we have described a machine embodying the principles of the invention as used in the pickling of rim strips or ring strips it is evident that the invention contemplates a machine for use in pickling strip stock of various forms and may be effectively used for such purpose.

We are aware that numerous details of construction may be varied through a wide range without departing from the principles of this invention, and we therefore do not purpose limiting the patent granted hereon otherwise than necessitated by the prior art.

We claim as our invention:

1. An automatic pickling machine comprising a framework, a plurality of tanks mounted thereon, a pair of endless conveyor chains supported on said framework, means for driving said chains, a plurality of cross rods connecting said chains, a pair of double-hook type carriers pivotally mounted on each of said cross rods, guides on the loading end of said framework to hold a pair of said carriers in position to permit loading of the articles to be pickled, said chains arranged to automatically carry the loaded carriers and the articles thereon successively through the various tanks to permit the articles to be pickled, rinsed and neutralized, a stationary platform through which the carriers pass to cause the articles to be deposited on said platform, a pivoted table, kick-off mechanisms operated from the machine for delivering said articles from said platform onto said table, and cam operated means operated from the machine driving means adapted to act at predetermined times to tilt said table to cause the articles deposited thereon to be discharged from the machine.

2. An automatic pickling machine comprising a framework, a plurality of endless conveyor chains thereon, means for driving the same, a plurality of pairs of pivotally supported carriers carried by said chains, stop means on said framework to permit pairs of said carriers to be loaded with articles to be pickled, a row of tanks in said framework through which the carriers and articles are adapted to be successively conducted by said chains to permit the articles to be pickled, rinsed and neutralized, a stationary article receiving platform through which said carriers are adapted to pass to permit unloading of the carriers, and kick-off mechanisms operated by the machine driving means and acting through said stationary platform to automatically discharge the pickled articles from said platform.

3. An automatic pickling machine comprising a framework, a plurality of tanks mounted therein, a pair of endless chains movably supported on said framework, cross rods connecting said chains, article carriers pivotally supported on said cross rods, means for holding said carriers against pivotal movement when in loading position, driving means for operating said chains to cause the same to successively carry the carriers and articles thereon through said tanks to permit the articles to be pickled, rinsed and neutralized, a stationary platform through which said carriers are adapted to pass to cause the articles to be removed from the carriers, a pivoted table, kick-off mechanisms rotatable through said stationary platform operable from said driving means to cause the articles on said platform to be delivered onto said table, and control mechanisms operable from said driving means adapted at predetermined times to tilt said table to cause the articles thereon to be discharged from the machine.

4. An automatic pickling machine comprising a framework, a plurality of tanks therein, means for automatically carrying articles successively into and out of said tanks to permit the articles to be pickled, rinsed and neutralized, a driving mechanism for operating said carrying means, a platform for stripping the pickled articles from said carrying means, and kick-off means operated by said driving mechanism adapted to rotate through said platform to discharge the pickled articles from said platform.

5. An automatic pickling machine comprising a framework, a row of tanks thereon, carrying means for carrying articles to be pickled in successive order through said tanks to cause the articles to be pickled, rinsed and neutralized, a driving mechanism for operating said carrying means, a stationary platform positioned to remove the pickled articles from said carrying means, a table movably mounted on the framework, a kick-off mechanism operated by said driving mechanism to automatically remove the articles from said platform, and deliver the same to said table when the table is in a receiving position, a cam mechanism operable by said driving mechanism adapted at predetermined times to operate said movable table to cause the same to discharge the articles thereon from the machine.

6. In an automatic pickling machine of the class described, the combination with a plurality of tanks, mechanisms for carrying a plurality of different articles through said tanks in a certain definite sequence to pickle, rinse and neutralize said different articles, a stationary platform, a movable table positioned adjacent thereto, said mechanisms adapted to pass through said platform to deliver the pickled articles thereon, kick-off means rotatably acting through said platform to discharge the articles therefrom, and means for actuating said table at predetermined times to permit one class of the pickled articles to be discharged from said table while another class of said articles are discharged directly from said platform.

In testimony whereof we have hereunto subscribed our names.

CONSTANTINE G. MILLER.
CHARLES F. CLEVELAND.